March 24, 1964  L. WADDY  3,126,107
PIPE HANDLING DEVICE
Filed Sept. 5, 1961  3 Sheets-Sheet 1
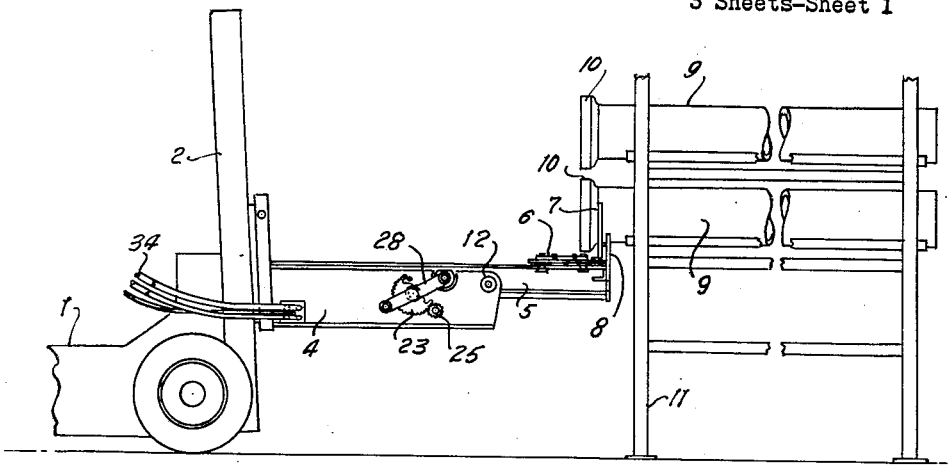
Fig. I
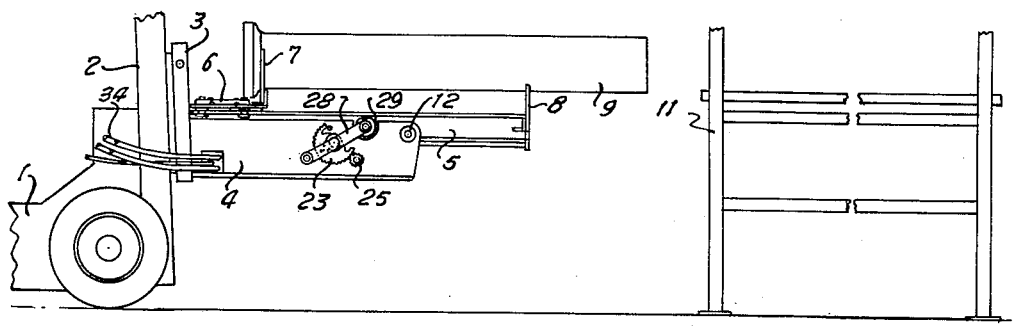
Fig. II
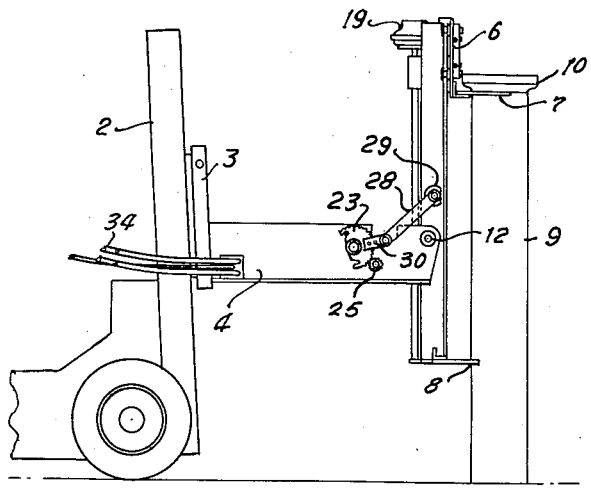
Fig. III
INVENTOR
Luther Waddy
BY Howard E. Moore
ATTORNEY

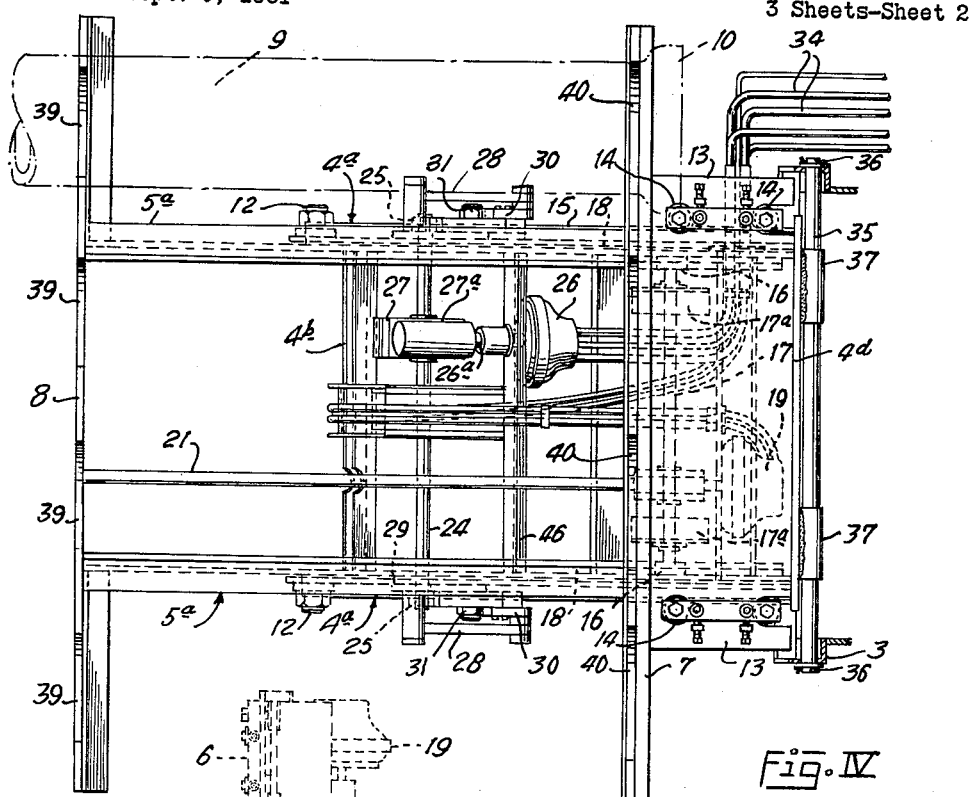
Fig. IV
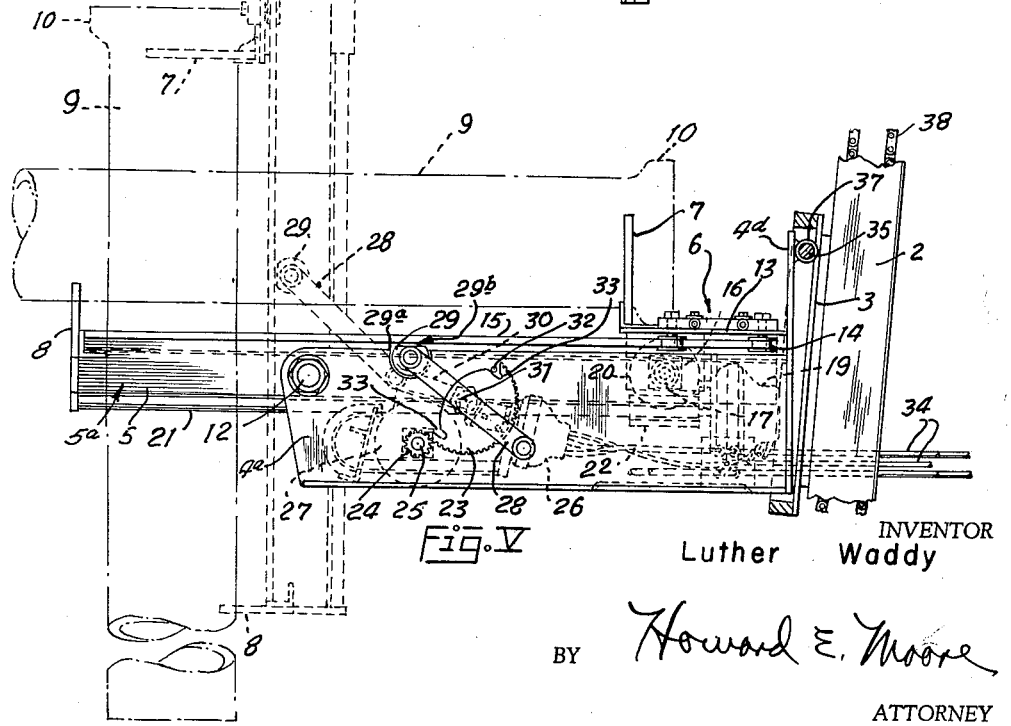
Fig. V
INVENTOR
Luther Waddy

March 24, 1964
L. WADDY
3,126,107
PIPE HANDLING DEVICE
Filed Sept. 5, 1961
3 Sheets-Sheet 3
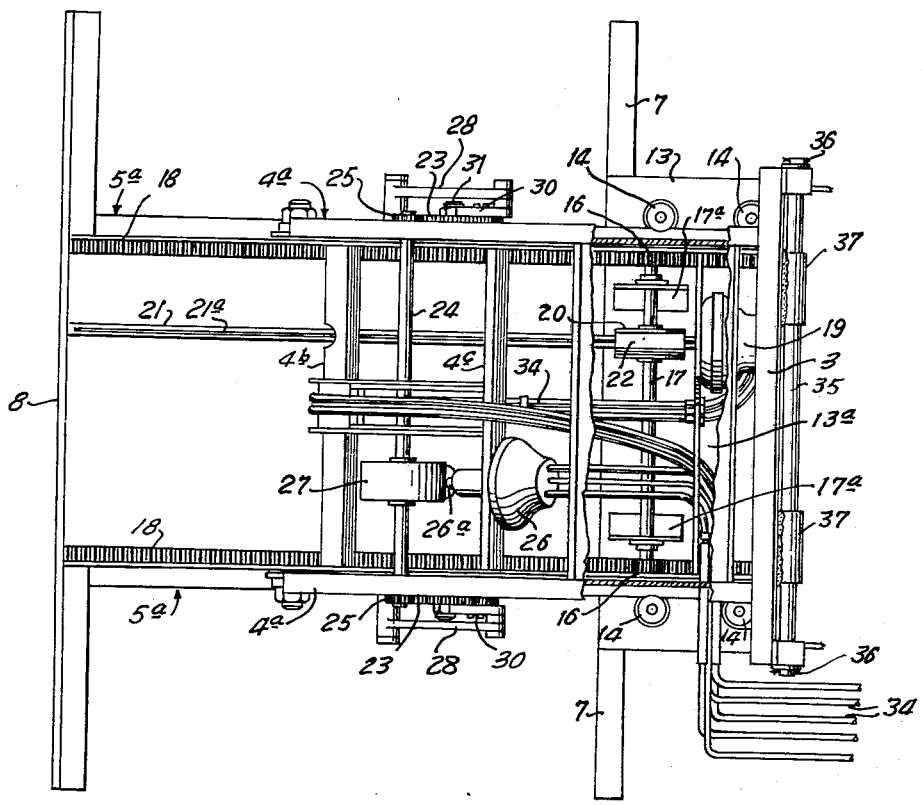
Fig. VI
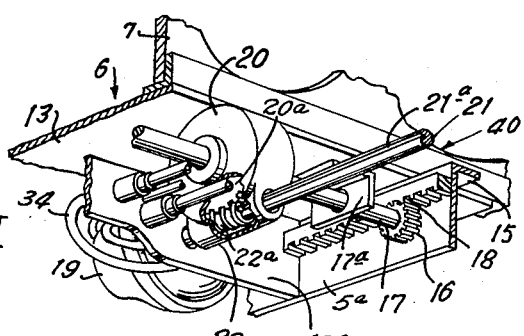
Fig. VII
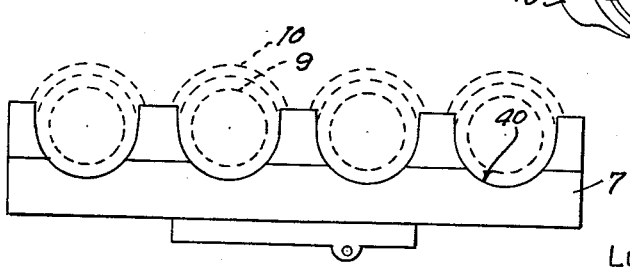
Fig. VIII
INVENTOR
Luther Waddy
BY Howard E. Moore
ATTORNEY ated Mar. 24, 1964

3,126,107
PIPE HANDLING DEVICE
Luther Waddy, Mineral Wells, Tex., assignor to Can-Tex Industries, Inc., Mineral Wells, Tex., a corporation of Texas
Filed Sept. 5, 1961, Ser. No. 135,994
15 Claims. (Cl. 214—7)

This invention is concerned with a material handling device, and is particularly concerned with a material handling device primarily adapted to load, transport and deposit cylindrical objects, such as large pipe, by remote manpulation by the operator.

In the manufacture of ceramic pipe, it is customary to mold and shape the pipe from clay and place such molded pipe in drying racks for drying and curing, and after suitable curing, the pipe is removed from the racks and fired in a kiln with sufficient heat and for sufficient period of time to cure and harden the pipe to thereby make ceramic pipe therefrom.

It has been a problem in the art to remove and transport the uncured pipe without breakage, inasmuch as it is in a relatively brittle state before curing by heat, and such operation, when carried out by hand, in a laborious and time-consuming operation inasmuch as the pipe sections are usually very large and heavy.

This invention is primarily intended to provide a mechanical device, attachable to a conventional fork lift truck mast, to provide for the removal of the uncured pipe sections from the drying rack, transporting same and depositing same on the end by an efficient and gentle movement, so as to minimize the breakage thereof to the greatest extent possible.

Although the embodiment of the invention disclosed herein is primarily designed for withdrawing pipe from curing racks, transporting and depositing same, and the reverse of such procedure, it will be understood that the invention could be adapted for loading, transporting and depositing various and sundry types of elongated objects, such as posts, steel beams, crates, and the like, by simply changing the shape and configuration of the saddle holders carried by the material handling device.

It is, therefore, a primary object of the invention to provide a material handling device for efficiently and easily loading, transporting and depositing elongated articles without manual handling.

Another object of the invention is to provide a material handling device attachable to a conventional fork lift truck mast which may be operated by power on the fork lift truck to remove and load elongated objects from racks, transport same, and deposit same in multiple quantities in such a manner as to reduce to a minimum the possibilities of dropping and breaking the articles as they are being handled.

Still another object of the invention is to provide a material handling device attachable to a fork lift truck, and operated by the power thereof, which includes a fixed horizontally extending frame, another frame tiltably and pivotally attached to the fixed frame, and a slidable carriage carried by the tiltable frame, which is movable longitudinally of the tiltable frame, and wherein there is an engaging yoke on the tiltable frame and on the slidable carriage arranged to engage articles to be picked up, transported and deposited.

Another object of the invention is to provide such a material handling device, wherein the load supporting yokes have spaced engaging recesses thereon in longitudinal alignment in the respective yokes, so that a plurality of horizontally aligned pipes or other cylindrical members can be removed from a rack, loaded, and transported in a single, continuous operation.

Still another object of the invention is to provide such a material handling device which is quickly adjustable in height to withdraw pipes or multiple cylindrical members, crates, etc. from racks at varying elevations.

Another object of the invention is to provide in such a material handling device hydraulic motors mounted on a suitable frame for separately actuating the tiltable frame and the slidable carriage by appropriate controls.

A still further object of the invention is to provide in such a material handling device yokes or saddles for loading and supporting pipes or other cylindrical objects wherein the engaging recesses on the movable carriage are at a slightly higher elevation than the recesses in the yoke on the tiltable carriage so that in pulling the pipes or cylindrical objects out of the rack, they will not slide upon the surfaces of the recesses of the yoke on the tiltable carriage, which could mar or damage uncured clay pipe, but are in position to engage and support the pipe when it has been pulled upon the tiltable carriage to sufficient extent to be supported at each end upon the yokes.

A further object of the invention is to provide in such a device a simple and easy means for attachment of same to the hoist on a fork lift truck, and which is also easily detachable therefrom.

Still another object of the invention is to provide in such a device means for tilting a pipe or other cylindrical object on end after being transported on the device, without the danger of damaging same by dropping or jolting against the surface on which it is deposited.

A general object of the invention is to provide a material handling device of relatively simple construction, which is easy to manipulate.

Other and further objects of the invention will become apparent upon reading the detailed specification hereinafter following, and by referring to the drawings annexed hereto and made a part hereof.

A suitable embodiment of the invention is shown in the attached drawings wherein:

FIGURE I is a side elevational view of the material handling device attached to the hoist of a fork lift truck, as it would appear with the longitudinally movable carriage in extended position for engagement of the yoke thereon with a plurality of uncured clay pipes in a rack;

FIGURE II is a side elevational view of the material handling device as it would appear with the longitudinally movable carriage in retracted position after the pipe has been withdrawn from the rack and is supported on the yokes of the movable carriage and the tiltable frame;

FIGURE III is a side elevational view of the material handling device as it would appear with the tiltable frame in tilted vertical position for depositing the pipe on end;

FIGURE IV is a top plan view of the material handling device, showing the movable carriage thereon in retracted position;

FIGURE V is a side elevational view of the material handling device with the longitudinally movable carriage thereon in retracted position;

FIGURE VI is a bottom plan view of the material handling device, showing the longitudinally movable carriage is retracted position, with the bottom plate of the fixed frame cut away to show the underside of the movable carriage;

FIGURE VII is a fragmentary, perspective view of the under side of the longitudinally movable carriage showing the hydraulic motor, the gear box, pinion shaft and pinion, and rack gear secured to the side frame of the titltable carriage; and FIGURE VIII is an end elevational view of the yoke attached to the movable carriage, showing the semicircular recesses therein for receiving and supporting cylindrical pipe or other objects.

Numeral references are employed to indicate the various parts shown in the drawings, and like numerals indicate like parts throughout the various figures of the drawings.

The numeral 1 generally indicates a conventional fork lift truck having the usual tiltable mast 2 thereon with a fork mount 3 which may be raised and lowered on the endless chains 38 rotatably carried on the mast 2.

The fixed longitudinal frame 4, including spaced side members 4a, supported and separated by lower cross braces 4b and 4c, is attached to the fork mount plate 3 by means of tubular loops 37 welded to the end plate 4d, secured between the longitudinal side frames 4a. The shaft 35 extends through loops 37 and through holes provided in the sides of fork mount 3, and is secured therein against lateral movement by the cotter keys 36.

The tiltable carriage, or frame 5, is formed by spaced longitudinal L-plates 5a, which are spaced, supported and separated by the cross braces 5b, is pivotally attached to the sides 4a of fixed frame 4 by means of pivot bolts 12.

A longitudinally movable carriage, or frame 6, is mounted on the tiltable frame 5, said longitudinally movable carriage 6 having a load engaging yoke 7 thereon which has semi-circular cutouts or recesses 40 in the upper surface thereof arranged to engage the surface of a pipe or other cylindrical member for withdrawing same from a rack, and transporting same in the manner hereinafter described.

A similar material engaging yoke 8 is attached to a tiltable frame 5, and extends upwardly therefrom, having a plurality of semi-circular pipe or cylindrical object engaging recesses or cut out portions 39 in the upper surface thereof in which may be engaged and cradled a plurality of cylindrical objects, such as a pipe 9, disposed in a drying rack 11. Said pipe 9 may have an enlarged flange 10 on the end thereof behind which the recesses 39 of the yoke 8 may engage so that when the movable carriage 6 is retracted in the manner hereinafter described, the pipe may be pulled from the rack.

The carriage 6 includes a transverse support plate 13 to which is mounted the rotatable flanged rollers 14 which extend therebelow. The rollers 14 have flanged grooves therein rotatably engaged with the laterally extending flanges 15 on the side members 5a of the tiltable frame 5, so that as the movable carriage 6 traverses along the tiltable frame 5 in the manner hereinafter described, the rollers 14 will be caused to rotate along the lateral flanges 15, and maintain the movable carriage in alignment on the tiltable frame.

Rack gears 18 are secured to the under side of the side members 5a of the tiltable frame 5.

Pinion gears 16 are secured to opposite ends of the rotatable shaft 17. The rotatable shaft 17 extends through, and rotates in, passages provided the L-shaped braces 17a secured to the underside of the plate 13 of the movable carriage 6.

A hydraulic motor 19 is secured to the cross brace 13a extending between the sides 5a of the tiltable frame 5. The drive shaft 21 extends from the hydraulic motor 19, through the brace 13a and through a sleeve 22 extending downwardly from the gear housing 20.

A worm gear 22a is rotatably disposed within sleeve 22 and is slidably keyed to the drive shaft 21, the keyway on the shaft 21 being indicated at 21a.

The shaft 21 is rotatably mounted in a suitable bearing in the end plate or yoke 8 at its outer end, and is rotatably mounted in a suitable bearing in the plate 13a so that the shaft 21 is rotatable by the hydraulic motor 19.

The worm gear 22a within sleeve 22, which is slidably keyed to the shaft 21, meshes with a spur gear 20a secured to the rotatable shaft 17 within the gear housing 20 to thereby rotate the shaft 17. The rotation of the shaft 17 causes the spur gears 16 on the outer ends thereof to move along the rack gears 18, thereby causing the longitudinally movable carriage 6 to move along the tiltable frame 5 on the rollers 14, the direction of movement thereof being determined by the direction of rotation of the hydraulic motor 19.

The motor 19 is a bi-directional motor, and the direction of rotation thereof, as well as the rate of rotation thereof, may be controlled by a suitable valve control (not shown) at the operators position on the fork lift truck, by controlling the direction of flow, and rate of flow, of hydraulic fluid through the motor 19 through the hydraulic supply hoses 34.

As the shaft 21 rotates, rotating the shaft 17 in the manner hereinbefore described, the movable carriage 6 moves along the shaft 21, as the worm gear housing 22 and the worm gear therein slides along the shaft 21.

Means is provided for tilting the tiltable frame 5 to vertical position, as shown in broken lines in FIGURE V, which will be hereinafter described.

A sector gear 23 is rotatably mounted on the outer side of each of the stationary side frames 4a by means of a pivot shaft 31. Sector gears 23 are rotatable by intermeshed pinion gears 25 positioned on the outer sides of the fixed frames 4a. The pinion gears 25 are secured to the outer ends of a rotatable shaft 24 which rotatably extends through suitable bearings mounted in passages through the fixed side frame members 4a.

The shaft 24 extends through a gear housing 27 to the upper side of which is secured a cylindrical worm gear housing 27a. The drive shaft 26a extends from the hydraulic motor 26 and rotatably extends into the worm gear housing 27a. A worm gear, similar to worm 22a, is secured to drive shaft 26a inside housing 27. The worm gear within said housing 27a meshes with a suitable spur gear, similar to spur gear 20a, secured to the shaft 24 inside the gear housing 27. By actuation of the hydraulic motor 26, through suitable valve controls at the operator's position on the fork lift truck, the motor 26 may be rotated in two directions at controlled rates of speed, as desired, to thereby rotate the shaft 24, which in turn rotates the pinion gears 25 on the outer ends thereof to rotate the sector gears 23.

The lift arms 28 are pivotally attached at their inner ends to the outer ends of crank arms 30, and the inner end of the crank arms 30 are secured to sector gears 23, so that the crank arms 30 rotate with the sector gears 23.

A roller 29 is rotatably attached to the outer end of each lifting arm 28. The roller 29 has a round side thereon arranged to be received in the semi-circular recess 29a formed in the upper edge of each fixed frame member 4a, and each roller 29 has a flat surface 29b thereon arranged to engage the underside of the flange 15 of the tiltable frame 5 on each side thereof.

A stop pin 32 is provided to extend outwardly from the outer side of each of the side frames 5a to engage in the slots 33 provided in the inner edge of the sector gears 23 to limit the rotation of sector gears 23 and thereby the up and down movement of tiltable frame 5.

By rotating the shaft 24 by actuation of the hydraulic motor 26, through the gears in the gear housing 27—27a, the sector gears 23 may be rotated, to cause the crank arms 30 to rotate and move the thrust arm 28 outwardly thereof, thereby exerting upward force on the tiltable frame 5, to cause it to pivot upwardly about the pivot bolts 12 to a vertical position, as shown in broken lines in FIGURE V; and when it is desired to lower the tiltable frame 5, the sector gears 23 may be counter rotated by changing the direction of flow of the hydraulic fluid through the control valve (not shown), to retract the arm 28 and allow the tiltable frame 5 to move back to horizontal position by virtue of the reverse movement of the moving elements as described in the above upward movement sequence.

The operation and function of the device hereinbefore described is as follows:

When it is desired to lift a horizontally aligned row of pipes 9 from the rack 11, the movable carriage 6 is moved to the outer end of the tiltable frame 5 by energizing the hydraulic motor 19 to rotate the shaft 21 in the necessary direction, to cause the transverse shaft 17 to rotate in a direction, to cause the pinion gears 16 to roll along the rack gears 18 toward the outer end of the tiltable frame 5. As the movable carriage 6 moves along the tiltable frame 5, the sleeve 22 and the worm gear therein slides along the keyway 21a of drive shaft 21.

The fork mount 3 on which the fixed frame 4 is secured, is lowered by rotating the chains 38 about the mast 2, to a position so that the yoke 7 on the movable carriage 6 will pass underneath the collars 10 on the pipe sections 9. The fork mount 3 is then raised to a position so that the pipe 9 will be cradled in the semi-circular recesses 40 on the yoke 7 behind the collars 10. It will be noted from FIGURE I that in this position the semi-circular recesses 39 in the yoke 8, attached to the tiltable frame 5, do not engage the pipe 9 until the pipe is withdrawn from the rack. By virtue of such arrangement, the pipe 9, which is relatively fragile before being fired, is not dragged over the surfaces of semi-circular recesses 39 in the yoke 8 while being withdrawn from the rack. Upon the outer end of the pipe 9 being withdrawn from the rack 11, the outer end of the pipe is caused to come to rest in the recesses 39 of the yoke 8 by a slight backward tilting of the fork truck mast, where it is suspended, as shown in FIGURE II.

The movable carriage 6 is retracted to withdraw the pipe from the rack 11 by reversing the hydraulic motor 19, thereby causing the shaft 17 to rotate in the opposite direction from the initial rotation, causing the gears 16 to roll inwardly along the rack gears 18, to thereby move the carriage 6 inwardly along the tiltable frame 5 towards the mast 2, to the position shown in FIGURE II.

The pipe sections 9 are thus supported on the cradles 7 and 8, where they may be transported to a desired location for firing, or in the event the pipe has already been fired, it may be transported for loading or otherwise in the manner hereinbefore described. When it is desired to dismount the pipe sections 9 from the tiltable frame 5, the tiltable frame may be moved to vertical position to set the pipe sections 9 on end, as shown in FIGURE III by raising the fork mount 3 and energizing the hydraulic motor 26, causing the shaft thereof to rotate in a direction to cause the shaft 24 to rotate the sector gears 23 and rotate the crank arms 30 in a clockwise direction to thereby extend the lifting arm 28 outwardly, to lift the frame 5 upwardly to vertical postion, as shown in FIGURE III. The stop pins 32 and the slots 33 in the sector gears 23 limit the rotation of the sector gear 23 in both directions.

After the pipe sections 9 have been set on end by raising the fork mount 3 and tilting the frame 5, as above described, the fork lift truck may be backed away from the pipe, disengaging the yokes 7 and 8 therefrom. The tilting frame 5 may be returned to normal position, by reversing the motor 26, thereby counter rotating the sector gear 23 and retracting the lifting arm 28, allowing the tiltable frame 5 to lower to horizontal position by reverse rotation of the elements hereinbefore described, as shown in FIGURE I.

All the aforesaid operation may be carried out by the fork truck operator, by simply manipulating suitable valve controls, to control the operation of the hydraulic motors 19 and 26, and manipulating the fork lift mast 2 and mount 3 by the usual controls on the fork lift truck 1.

It will be understood that other and further forms of my invention may be devised without departing from the spirit and scope of the appended claims.

Having described my invention, I claim:

1. In a device of the class described, a fixed horizontal frame; a tiltable frame pivotally attached to the fixed frame at the outer end of the fixed frame; said tiltable frame having a portion at the outer end thereof extending beyond the outer end of the fixed frame when disposed in horizontal position thereon; means to lift the tiltable frame from a horizontal to a vertical position relative to the horizontal frame; a carriage mounted on the tiltable frame movable longitudinally thereon from the inner end thereof to the outer end thereof; means to move the carriage longitudinally of the tiltable frame; means mounted on the carriage engageable with an article to be pulled upon the tiltable frame when the said means is moved on the carriage beyond the outer end of the fixed frame; and means mounted on the outer end of the tiltable frame engageable with the article to support same thereon.

2. The combination called for in claim 1 wherein the tiltable frame is pivoted to the fixed frame off-center so that the tiltable frame will lower into horizontal position upon retracting the lifting means.

3. The combination called for in claim 1 wherein the means mounted on the carriage engageable with an article to be pulled on the tiltable frame, comprises a transverse yoke with at least one recess therein engageable with such article.

4. The combination called for in claim 3 wherein the recess in the yoke member is semi-circular in shape arranged to engage a cylindrical object.

5. In a device of the class described a horizontal frame including spaced side members; a tiltable frame including spaced side members pivotally attached to the horizontal frame at the outer end thereof, said tiltable frame having a portion at the outer end thereof extending beyond the outer end of the horizontal frame when the tiltable frame is disposed in horizontal position thereon; a laterally extending flange on each side member of the tiltable frame; a carriage mounted on the tiltable frame and being movable from the inner end thereof outwardly beyond the outer end of the horizontal frame when the tiltable frame is in horizontal position; roller means attached to the carriage at each side thereof, rotatably engaging the lateral flanges of the tiltable frame; extensible means carried by the horizontal frame engageable with the tiltable frame inwardly of the pivotal attachment thereof to the horizontal frame to lift same upwardly with relation to the horizontal frame; means to move the carriage longitudinally of the tiltable frame; load supporting means on the outer end of the tiltable frame engageable with an article to be carried thereon; and load supporting means on the carriage arranged to engage said article to pull same upon the tiltable frame to a position of support on the first named load supporting means.

6. The combination called for in claim 5 wherein the means for lifting the tiltable frame comprises sector gears mounted on the outer sides of each of the spaced side members of the horizontal frame, a crank arm attached at one end to the sector gear, a lifting arm pivotally attached to the outer end of the crank arm; a roller attached to the outer end of the lifting arm engageable with the laterally extending flanges of the tiltable frame; and means to rotate the sector gears.

7. The combination called for in claim 6 with the addition of a recess in the upper edge of each of the side members of the horizontal frame members arranged to receive the roller.

8. The combination called for in claim 7 wherein the roller has a rounded side and a flat side; and a recess is formed in the upper edge of each of the side members of the horizontal member arranged to receive the rounded sides of the rollers.

9. The combination called for in claim 5 wherein the means for moving the carriage with reference to the tiltable frame comprises a rack gear mounted on the underside of each of the side members of the tiltable frame, motor means attached to the tiltable frame, a drive shaft extending from the motor means and rotatably mounted with reference to the tiltable frame; a gear housing mounted on the carriage including a portion through which the drive shaft slidably extends; gear means slidably keyed to the drive shaft to rotate therewith; a transverse shaft arranged to be driven by the drive shaft; a pinion gear on each end of the transverse shaft in mesh with the rack gears whereby when the transverse shaft is rotated, the pinion gears will roll along the rack gears, moving the carriage therewith as the slidably keyed gear means slides along the drive shaft; and gear means attached to the transverse shaft in mesh with the slidably keyed gear means to rotate the transverse shaft.

10. The combination called for in claim 9 wherein the slidably keyed gear is a worm gear and the gear means attached to the transverse shaft is a spur gear.

11. The combination called for in claim 9 wherein the motor means comprises a hydraulic motor.

12. In a combination with a vehicle having a vertical mast thereon, a mounting member attached to the mast, and means to raise and lower the mounting member relative to the mast; a horizontal frame attached at its inner end to the mounting member; a tiltable frame pivotally attached to the horizontal frame member having a portion extending beyond the outer end of the horizontal frame; a carriage mounted on the tiltable frame and being movable longitudinally of the tiltable frame from the inner end thereof outwardly beyond the outer end of the horizontal frame when the tiltable frame is in horizontal position; means to tilt the tiltable frame from a horizontal position to a vertical position with relation to the horizontal frame; means to move the carriage longitudinally of the tiltable frame; load support means at the outer end of the tiltable frame; and load support means on the carriage.

13. The combination called for in claim 12 wherein the vertical mast is tiltable forwardly.

14. The combination called for in claim 13 wherein the load support means comprises transverse members having spaced recesses formed in the upper edge thereof arranged to cradle articles to be handled thereon.

15. The combination called for in claim 14 wherein the recesses are semi-circular in shape.

References Cited in the file of this patent

UNITED STATES PATENTS

| | | |
|---|---|---|
| 967,040 | McWane et al. | Aug. 9, 1910 |
| 1,837,846 | Appleyard | Dec. 22, 1931 |
| 1,900,569 | Lederer | Mar. 7, 1933 |
| 2,508,698 | Von Beren | May 23, 1950 |
| 2,684,773 | Boyles | July 27, 1954 |
| 2,921,704 | Schultz | Jan. 19, 1960 |
| 3,075,656 | Pearne | Jan. 29, 1963 |